US012203293B2

(12) United States Patent
Chan

(10) Patent No.: US 12,203,293 B2
(45) Date of Patent: Jan. 21, 2025

(54) LOCK AND SUITCASE

(71) Applicant: DURAFLEX HONG KONG LIMITED, HongKong (CN)

(72) Inventor: Man Chak Chan, HongKong (CN)

(73) Assignee: DURAFLEX HONG KONG LIMITED, Hong Kong (CN)

( * ) Notice: Subject to any disclaimer, the term of this patent is extended or adjusted under 35 U.S.C. 154(b) by 243 days.

(21) Appl. No.: 17/984,302

(22) Filed: Nov. 10, 2022

(65) Prior Publication Data

US 2023/0065677 A1 Mar. 2, 2023

Related U.S. Application Data

(63) Continuation of application No. PCT/CN2021/082148, filed on Mar. 22, 2021.

(30) Foreign Application Priority Data

May 14, 2020 (CN) ........................ 202010407790.0

(51) Int. Cl.
*A45C 13/10* (2006.01)
*A45C 5/03* (2006.01)
*E05B 65/52* (2006.01)

(52) U.S. Cl.
CPC ................ *E05B 65/52* (2013.01); *A45C 5/03* (2013.01); *A45C 13/10* (2013.01)

(58) Field of Classification Search
CPC ........ A45C 13/1084; A45C 13/10; A45C 5/03
See application file for complete search history.

(56) References Cited

U.S. PATENT DOCUMENTS 8,161,778 B1 * 4/2012 Ma ...................... E05B 47/0043 70/284
2004/0237605 A1 * 12/2004 Lin ...................... A44B 19/301 70/68

(Continued)

FOREIGN PATENT DOCUMENTS

CN 202866441 U 4/2013
CN 203239092 U 10/2013

(Continued)

*Primary Examiner* — Michael P Ferguson
*Assistant Examiner* — Thomas L Neubauer
(74) *Attorney, Agent, or Firm* — IPRO, PLLC

(57) ABSTRACT

Embodiments of the present application relate to the technical field of daily necessities, and in particular to a lock and a suitcase. The lock comprises: a lock main body, which is provided with an accommodating cavity, an opening, and a first through hole, and the opening and the first through hole both being in communication with the accommodating cavity; an elastic member, one end of which is fixed on the bottom of the accommodating cavity opposite the opening; and a clamping button, which comprises a button main body provided with a groove and a clamping boss obtained by extending from the button main body towards the groove, wherein the button main body is inserted into the accommodating cavity from the opening, the button main body is movable relative to the lock main body, the button main body abuts against the other end of the elastic member, and the clamping boss corresponds to the first through hole. By means of the lock, when a zipper piece on the suitcase presses the clamping button of the lock, a hole in the zipper piece is clamped into the clamping boss, and thus, the zipper piece on the suitcase can be locked.

10 Claims, 5 Drawing Sheets

(56) References Cited

U.S. PATENT DOCUMENTS

| | | | | |
|---|---|---|---|---|
| 2006/0254329 | A1 | 11/2006 | Yu | |
| 2013/0036778 | A1* | 2/2013 | Lai | E05B 37/12 70/63 |
| 2014/0060988 | A1* | 3/2014 | Lai | A45C 13/18 190/101 |
| 2020/0080355 | A1 | 3/2020 | Tung | |

FOREIGN PATENT DOCUMENTS

| | | | |
|---|---|---|---|
| CN | 104763247 | A | 7/2015 |
| CN | 107724787 | A | 2/2018 |
| CN | 109236065 | A | 1/2019 |
| CN | 109322562 | A | 2/2019 |
| CN | 110206401 | A | 9/2019 |

* cited by examiner

LOCK AND SUITCASE

CROSS-REFERENCE TO RELATED APPLICATIONS

The present application claims priority to Chinese Patent Application No. 2020104077900, entitled "LOCK AND SUITCASE" filed with the China National Intellectual Property Administration on May 14, 2020, which is incorporated by reference in its entirety.

TECHNICAL FIELD

Embodiments of the present application relate to the technical field of daily necessities, and in particular to a lock and a suitcase.

BACKGROUND

With the development of society, the progress of economy, and the improvement of people's living standard, the number of people's travels is gradually increasing. During traveling, people usually carry suitcases to store accompanying items. To protect privacy from being pried into and for easy access, a suitcase is often opened and closed with a zipper.

In the process of realizing the present application, the applicant of the present application found that: at present, zippers on suitcases available in the market are easy to open due to pressing and other reasons, which will give lawbreakers an opportunity. Therefore, it is urgent to design a lock that is suitable for use on a suitcase and can fix a zipper piece of the suitcase.

SUMMARY OF THE INVENTION

In view of the above problems, embodiments of the present application provide a lock and a suitcase, which overcome the above problems or at least partially solve the above problems.

According to one aspect of the embodiments of the present application, a lock is provided, including: a lock main body, which is provided with an accommodating cavity, an opening, and a first through hole, and the opening and the first through hole both being in communication with the accommodating cavity; an elastic member, one end of which is fixed on the bottom of the accommodating cavity opposite the opening; and a clamping button, which includes a button main body provided with a groove and a clamping boss obtained by extending from the button main body towards the groove, wherein the button main body is inserted into the accommodating cavity from the opening, the button main body is movable relative to the lock main body, the button main body abuts against the other end of the elastic member, and the clamping boss corresponds to the first through hole.

In an optional manner, one surface of the clamping boss facing the first through hole is an inclined surface inclined toward the accommodating cavity.

In an optional manner, the clamping button further includes a hook obtained by extending from the button main body; the lock main body is further provided with a second through hole in communication with the accommodating cavity, a hook portion of the hook extends into the second through hole, and the hook portion of the hook is movable relative to the second through hole.

In an optional manner, the button main body is further provided with a chute, the lock main body has a sliding rail protruding toward the accommodating cavity, the button main body is accommodated in the accommodating cavity, the sliding rail is clamped into the chute, and the sliding rail is slidable along the chute.

In an optional manner, quantities of the chutes and the sliding rails are at least two, at least two of the chutes are respectively located on two opposite surfaces of the button main body, and the chutes one-to-one correspond to the sliding rails.

In an optional manner, the clamping button further includes a locking portion obtained by extending from one end of the button main body close to the opening, the locking portion is provided with a locking hole, and the locking hole is used for inserting a locking pin.

In an optional manner, quantities of the clamping bosses and the first through holes are at least two, at least two of the clamping bosses are arranged side by side at an interval, and at least two of the first through holes are arranged side by side at an interval.

In an optional manner, the lock further includes a bottom plate, the bottom plate is provided with a third through hole, a first blocking piece and a second blocking piece extend from the bottom plate toward the third through hole, and the first blocking piece and the second blocking piece are arranged at an interval; a boss protrudes outward from the lock main body, a fixing piece extends from the boss, the boss is accommodated between the first blocking piece and the second blocking piece, the first blocking piece and the second blocking piece are located between the fixing piece and the lock main body, and the first blocking piece and the second blocking piece are used for limiting the position of the fixing piece.

In an optional manner, a position-limiting plate extends from the bottom plate toward the third through hole, the position-limiting plate points to a gap between the first blocking piece and the second blocking piece, and the position-limiting plate is spaced a predetermined distance from the gap.

According to one aspect of the embodiments of the present application, a suitcase including the above lock is provided.

Beneficial effects of the embodiments of the present application lie in that: a lock and a suitcase are provided, and the lock includes: a lock main body, which is provided with an accommodating cavity, an opening, and a first through hole, and the opening and the first through hole both being in communication with the accommodating cavity; an elastic member, one end of which is fixed on the bottom of the accommodating cavity opposite the opening; and a clamping button, which includes a button main body provided with a groove and a clamping boss obtained by extending from the button main body towards the groove, wherein the button main body is inserted into the accommodating cavity from the opening, the button main body is movable relative to the lock main body, the button main body abuts against the other end of the elastic member, and the clamping boss corresponds to the first through hole. When a zipper piece on the suitcase presses the clamping button of the lock, a hole in the zipper piece is clamped into the clamping boss, and the elastic member provides a pressure so that the zipper piece is locked.

BRIEF DESCRIPTION OF THE DRAWINGS

One or more embodiments are exemplified by pictures in corresponding accompanying drawings, these exemplifications do not constitute limitations of the embodiments, and elements with identical reference numerals in the accompanying drawings are denoted as similar elements. Unless otherwise stated, figures in the accompanying drawings do not constitute a scale limitation.

DETAILED DESCRIPTION

In order to facilitate the understanding of the present application, the present application will be described in more detail below with reference to the accompanying drawings and specific embodiments. It should be noted that when an element is expressed as being "fixed to" another element, it may be directly on the other element, or one or more intervening elements may exist therebetween. When an element is expressed as being "connected" to another element, it may be directly connected to the other element, or one or more intervening elements may exist therebetween. Terms "vertical," "horizontal," "left," "right," "inner," "outer," and similar expressions used in this specification are for illustrative purposes only.

Unless otherwise defined, all technical and scientific terms used in this specification have the same meaning as commonly understood by those of ordinary skill in the technical field belonging to this application. The terms used in the specification of the present application are only for the purpose of describing specific embodiments, and are not used for limiting the present application. As used in this specification, the term "and/or" includes any and all combinations of one or more of associated listed items.

Figure 1:
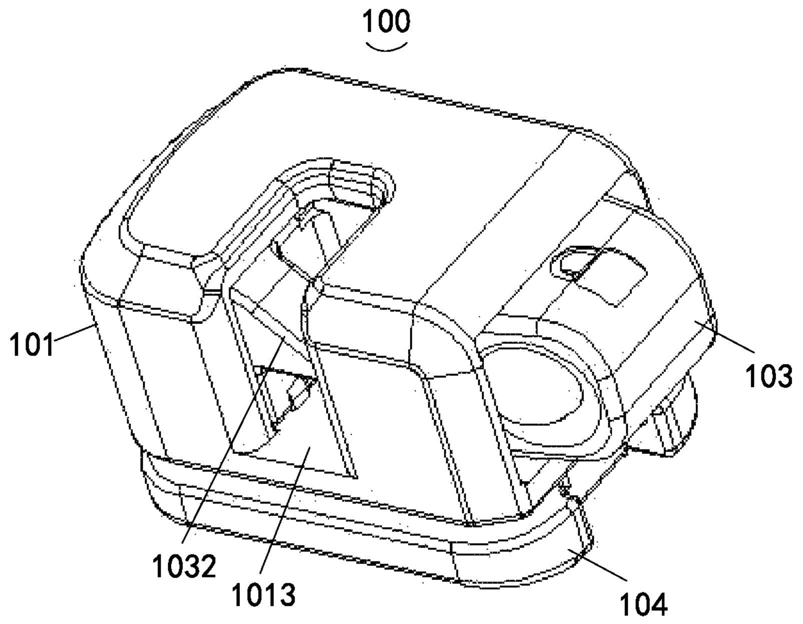
FIG. 1 is a schematic view of a lock according to an embodiment of the present application.
Figure 2:
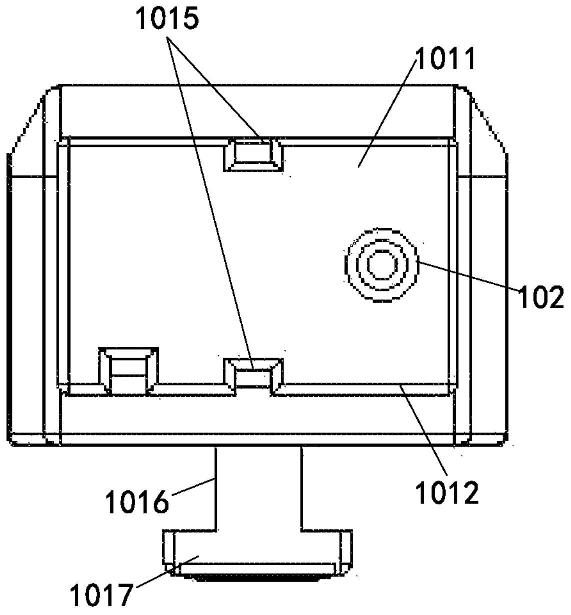
FIG. 2 is a side view of a lock main body connected to an elastic member according to an embodiment of the present application.

Referring to FIG. 1 and FIG. 2, a lock 100 includes a lock main body 101, an elastic member 102, a clamping button 103, and a bottom plate 104. The bottom plate 104 is connected to the lock main body 101, and the bottom plate 104 and the lock main body 101 hold an external object, so that the lock 100 is mounted on the external object. The clamping button 103 is at least partially accommodated in the lock main body 101, and the clamping button 103 is movable in the lock main body 101. The elastic member 102 is arranged on the lock main body 101, the elastic member 102 abuts against the clamping button 103, and the elastic member 102 is configured to provide an elastic force for the clamping button 103. When a product with a hole needs to be locked, such as a zipper piece of a suitcase, the product is inserted into the lock main body 101, and the clamping button 103 is pressed to compress the elastic member 102. When the hole of the product corresponds to the clamping button 103, under the elastic force of the elastic member 102, the hole of the product is inserted into the clamping button 103, the elastic member 102 returns to an original state, and the product is locked by the lock 100. When the product needs to be unlocked, an external force presses the clamping button 103 in a direction toward the elastic member 102 until the clamping button 103 is disengaged from the hole of the product, and then the product can be pulled out from the lock main body 101.

Figure 3:
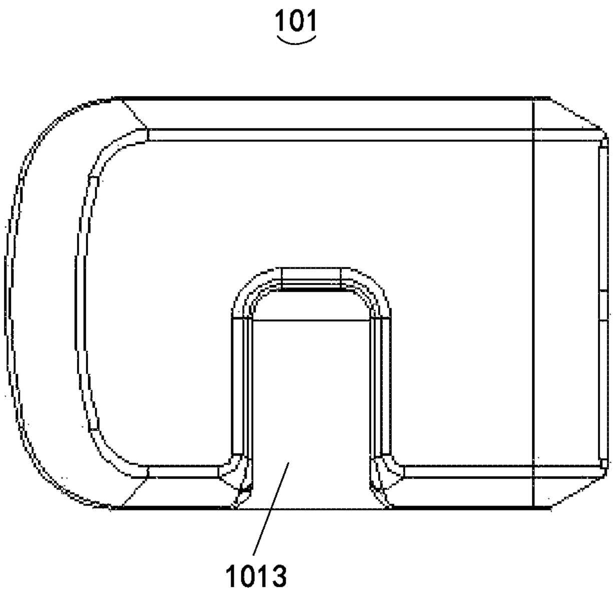
FIG. 3 is a front view of a lock main body according to an embodiment of the present application.
Figure 4:
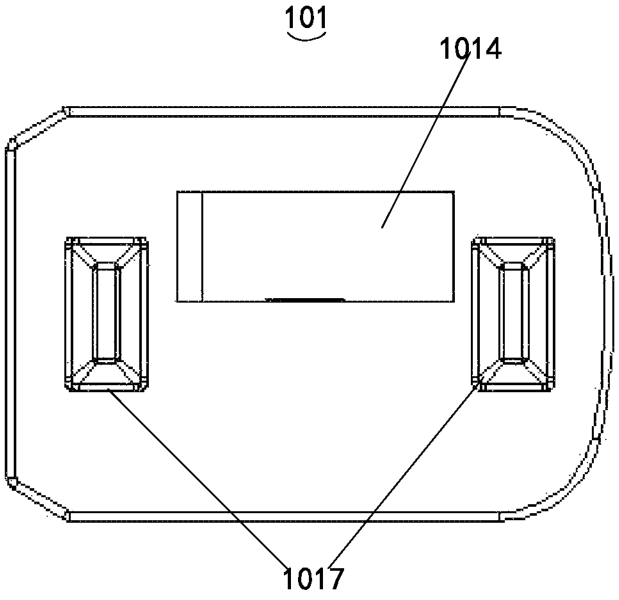
FIG. 4 is a top view of a lock main body according to an embodiment of the present application.

For the lock main body 101, referring to FIG. 2 to FIG. 4, the lock main body 101 is provided with an accommodating cavity 1011, an opening 1012, a first through hole 1013, and a second through hole 1014. The opening 1012 and the first through hole 1013 are both in communication with the accommodating cavity 1011. The opening 1012 is located at an end of the accommodating cavity 1011, the first through hole 1013 is located at a side of the accommodating cavity 1011, and the accommodating cavity 1011 is configured to accommodate the elastic member 102 and the clamping button 103. The first through hole 1013 is configured for insertion of the product with a hole. The second through hole 1014 is in communication with the accommodating cavity 1011, and the second through hole 1014 is configured to limit the position of the clamping button 103.

Further, a boss 1016 protrudes outward from the lock main body 101, a fixing piece 1017 extends from the boss 1016, and the boss 1016 and the fixing piece 1017 are configured to be fixed to the bottom plate 104.

For the above elastic member 102, as shown in FIG. 2, one end of the elastic member 102 is fixed to the bottom of the accommodating cavity 1011 opposite the opening 1012, and the other end of the elastic member 102 is used for abutting against the clamping button 103.

Figure 5:
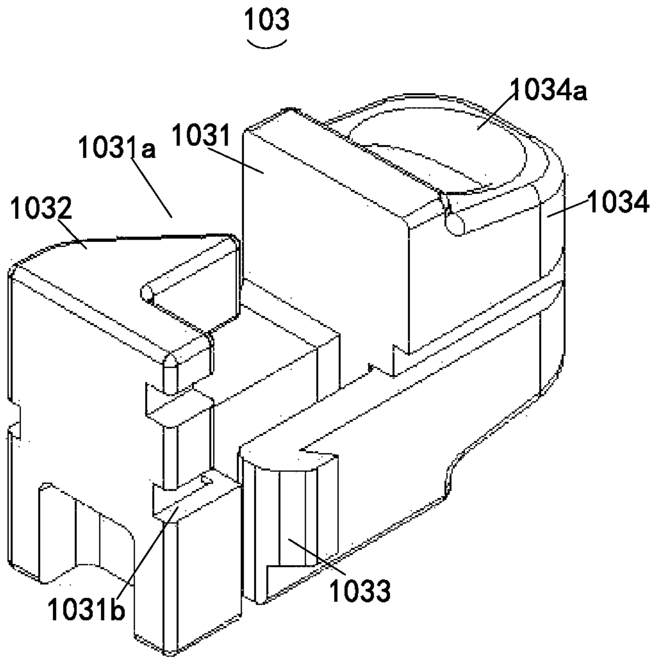
FIG. 5 is a schematic view of a clamping button in one direction according to an embodiment of the present application.
Figure 6:
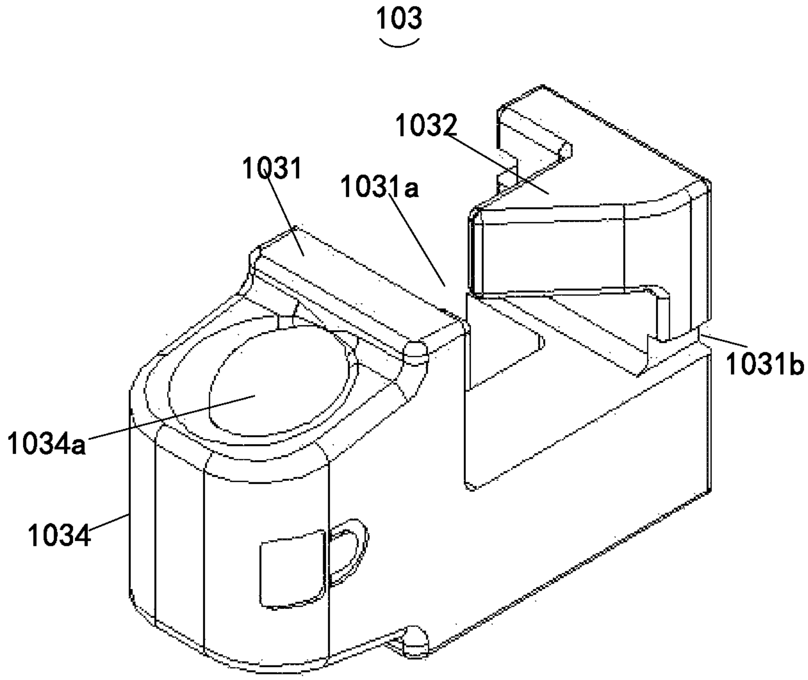
FIG. 6 is a schematic view of a clamping button in another direction according to an embodiment of the present application.

For the clamping button 103 described above, as shown in FIG. 5 and FIG. 6, the clamping button 103 includes a button main body 1031, a clamping boss 1032, a hook 1033, and a locking portion 1034. The clamping boss 1032, the hook 1033, and the locking portion 1034 are all arranged on the button main body 1031. The clamping boss 1032 is configured to clamp the product with a hole, the hook 1033 is configured to limit the position of the clamping button 103, and the locking portion 1034 is configured to lock the clamping button 103 and the lock main body 101.

For the above button main body 1031, a groove **1031*a* is arranged on the button main body 1031 and used for accommodating the clamping boss 1032. The button main body 1031 is inserted into the accommodating cavity 1011 from the opening 1012, the button main body 1031 is movable relative to the lock main body 101, and the button main body 1031 abuts against the other end of the elastic member 102**.

In some embodiments, the button main body 1031 may further be provided with a chute **1031*b*, and the lock main body 101 has a sliding rail 1015 protruding toward the accommodating cavity 1011. The button main body 1031 is accommodated in the accommodating cavity 1011, the sliding rail 1015 is clamped into the chute 1031*b*, and the sliding rail 1015 is slidable along the chute 1031*b*, thereby facilitating the movement of the button main body 1031 relative to the lock main body 101. Optionally, quantities of the chutes 1031*b* and the sliding rails 1015 are at least two. At least two of the chutes 1031***b* are respectively located on two opposite surfaces of the button main body 1031, at least two of the sliding rails 1015 are respectively arranged on two opposite inner surfaces of the accommodating cavity 1011, and the chutes 1031*b* one-to-one correspond to the sliding rails 1015.

It is understandable that the button main body 1031 may also be directly connected to the other end of the elastic member 102 by, for example, clamping, screw connection, and the like. When the button main body 1031 is connected to the elastic member 102, the elastic member 102 may also play a role of limiting the position of the button main body 1031, preventing the button main body 1031 from sliding out of the opening 1012 and being separated from the lock main body 101.

As for the above clamping boss 1032, the clamping boss 1032 is obtained by extending from the button main body 1031 toward the groove 1031*a*. When the button main body 1031 is inserted into the accommodating cavity 1011, the clamping boss 1032 corresponds to the first through hole 1013, and the clamping boss 1032 covers the first through hole 1013. When a product needs to be inserted, the button main body 1031 is pushed in the direction toward the elastic member 102 until the first through hole 1013 is opened, and then the product is inserted into the accommodating cavity 1011 from the first through hole 1013. When the hole of the product corresponds to the clamping boss 1032, the button main body 1031 is released, the button main body 1031 is reset under the force of the elastic member 102, and the clamping boss 1032 is inserted into the hole of the product to realize locking.

In some embodiments, one side of the clamping boss 1032 facing the first through hole 1013 is an inclined surface inclined toward the accommodating cavity 1011. In a process of inserting the product into the accommodating cavity 1011 from the first through hole 1013, the product first abuts against the inclined surface, and when a user pushes the product into the accommodating cavity 1011 forcefully, the product pushes the button main body 1031 to move in a direction toward the elastic member 102.

Figure 7:
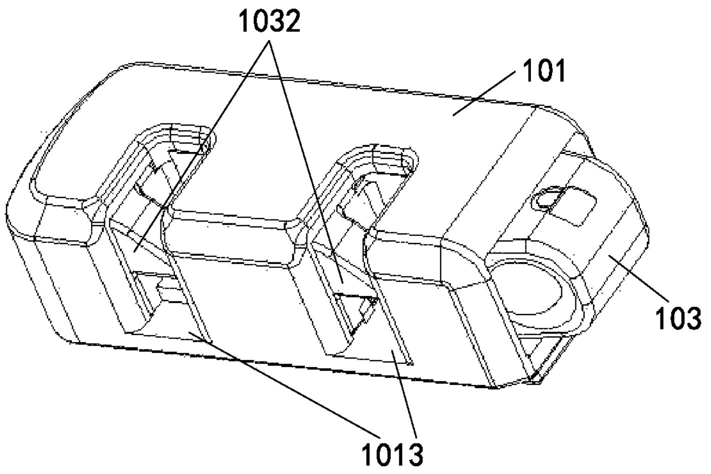
FIG. 7 is a schematic view of a lock with two first through holes according to an embodiment of the present application.

In some embodiments, referring to FIG. 7, quantities of the clamping bosses 1032 and the first through holes 1013 are at least two, at least two of the clamping bosses 1032 are arranged side by side at an interval, and at least two of the first through holes 1013 are arranged side by side at an interval. The at least two clamping bosses 1032 and the at least two first through holes 1013 are suitable for locking a plurality of products on the lock 100. For example, the quantity of zipper pieces on the suitcase is two, and the two zipper pieces close a zipper from two ends of the zipper of the suitcase. One of the zipper pieces is locked into one of the clamping bosses 1032, so as to fix the two zipper pieces.

For the above hook 1033, the hook 1033 is obtained by extending from the button main body 1031. A hook portion of the hook 1033 protrudes from the button main body 1031, the hook portion of the hook 1033 extends into the second through hole 1014, and the hook portion of the hook 1033 is movable relative to the second through hole 1014. During the movement of the button main body 1031 in a direction away from the elastic member 102, when the hook portion of the hook 1033 abuts against a side wall of the second through hole 1014 close to the opening, the button main body 1031 cannot continue to move in the direction away from the elastic member 102. During the movement of the button main body 1031 in a direction toward the elastic member 102, when the hook portion of the hook 1033 abuts against a side wall of the second through hole 1014 close to the elastic member 102, the button main body 1031 cannot continue to move in the direction toward the elastic member 102, thereby realizing the function of the second through hole 1014 limiting the position of the button main body 1031. In addition, by limiting the position of the button main body 1031 through the second through hole 1014, the situation where the button main body 1031 completely leaves the lock main body 101 and the button main body 1031 and the lock main body 101 are separated can be avoided during the movement of the button main body 1031 in the direction away from the elastic member 102.

Figure 8:
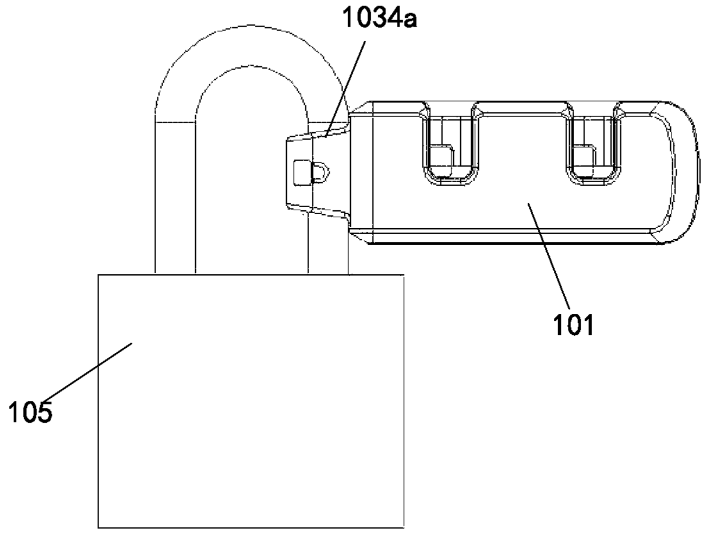
FIG. 8 is a schematic view of a lock connected to a lock with a key according to an embodiment of the present application.
Figure 9:
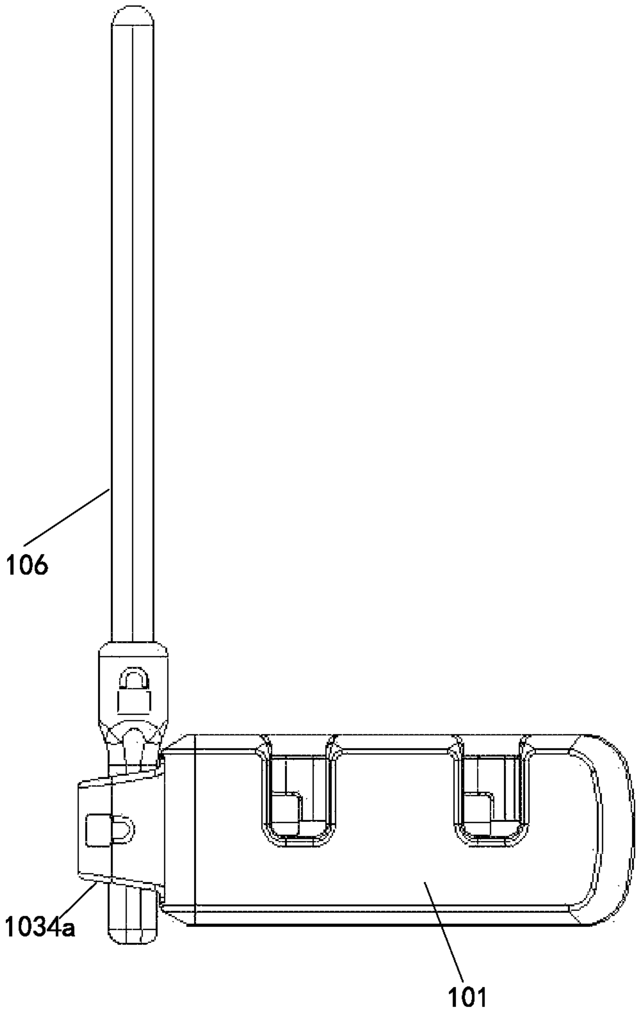
FIG. 9 is a schematic view of a lock connected to a connecting column according to an embodiment of the present application.

For the above locking portion 1034, the locking portion 1034 is obtained by extending from one end of the button main body 1031 close to the opening 1012. The locking portion 1034 is provided with a locking hole 1034*a*. When the button main body 1031 is inserted into the accommodating cavity 1011, the locking portion 1034 is exposed from the opening 1012, and a locking pin can be inserted into the locking hole 1034*a*. The locking pin abuts against an edge of the opening 1012, thereby locking the clamping button 103 and the lock main body 101. In some embodiments, referring to FIG. 8, the locking pin may be a keyed lock 105 or a combination lock (not shown). When the clamping button 103 and the lock main body 101 are locked, a key or a password is required for opening, which is more secure. Alternatively, referring to FIG. 9, the locking pin is a connecting column 106 with a rope, and the connecting column 106 is inserted into the locking hole 1034*a* to lock the clamping button 103 and the lock main body 101. The rope (not shown) connecting the connecting column 106 can be fixed to the product with a hole. Of course, for the selection of the locking pin, the user may select different locking pins according to security levels of places where the lock 100 needs to be used, which is not limited in this application.

Figure 10:
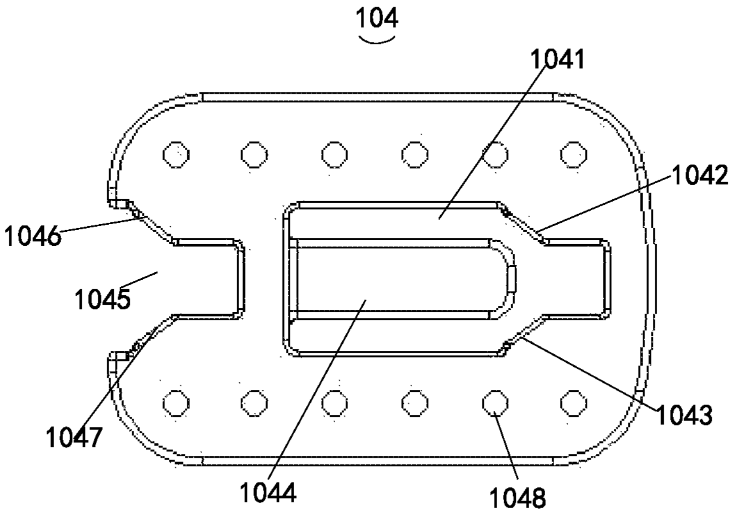
FIG. 10 is a schematic view of a bottom plate according to an embodiment of the present application.

For the above bottom plate 104, as shown in FIG. 10, the bottom plate 104 is provided with a third through hole 1041. A first blocking piece 1042 and a second blocking piece 1043 extend from the bottom plate 104 toward the third through hole 1041. The first blocking piece 1042 and the second blocking piece 1043 are arranged at an interval, thereby forming a gap. The boss 1016 is accommodated between the first blocking piece 1042 and the second blocking piece 1043, and the first blocking piece 1042 and the second blocking piece 1043 are located between the fixing piece 1017 and the lock main body 101, so the first blocking piece 1042 and the second blocking piece 1043 are configured to limit the position of the fixing piece 1017. The external object may be placed between the bottom plate 104 and the lock main body, and is clamped and fixed by the bottom plate 104 and the lock main body, thereby mounting the lock on the external object.

In some embodiments, a position-limiting plate 1044 extends from the bottom plate 104 toward the third through hole 1041, the position-limiting plate 1044 points to the gap between the first blocking piece 1042 and the second blocking piece 1043, and the position-limiting plate 1044 is spaced a predetermined distance from the gap. The position-limiting plate 1044 is configured to limit the position of the boss 1016 to prevent the boss 1016 from leaving the gap between the first blocking piece 1042 and the second blocking piece 1043. Optionally, the position-limiting plate 1044 may be made of an elastic material, and the position-limiting plate 1044 has an elastic deformation performance. When the boss 1016 is inserted into the gap between the first blocking piece 1042 and the second blocking piece 1043, the position-limiting plate 1044 is pressed downward, the position-limiting plate 1044 is elastically deformed, so that the position-limiting plate 1044 makes room for the boss 1016 to enter the gap between the first blocking piece 1042 and the second blocking piece 1043. When the boss 1016 completely enters the gap between the first blocking piece 1042 and the second blocking piece 1043, the external force is released, and the position-limiting plate 1044 returns to its original state.

Further, the edge of the bottom plate 104 is provided with a notch 1045, and a third blocking piece 1046 and a fourth blocking piece 1047 extend from the bottom plate 104 toward the third through hole 1041. The third blocking piece 1046 and the fourth blocking piece 1047 are arranged at an interval. Quantities of the bosses 1016 and the fixing pieces 1017 are two, one of the bosses 1016 is accommodated between the first blocking piece 1042 and the second blocking piece 1043, and the other of the bosses 1016 is accommodated between the third blocking piece 1046 and the fourth blocking piece 1047. The fixing piece 1017 may pass through a flexible material, such as cloth, and then be clamped to the bottom plate 104, thereby assembling the lock 100 on the flexible material.

In some embodiments, a surface of the bottom plate 104 facing the lock main body 101 is further provided with a plurality of protrusions 1048. When the external object is clamped by the bottom plate 104 and the lock main body 101, the plurality of protrusions 1048 will increase the frictional force between the bottom plate 104 and the external object, so that the lock 100 is better fixed to the external object.

In the embodiments of the present application, the lock 100 includes the lock main body 101, the elastic member 102, the clamping button 103, and the bottom plate 104. One end of the elastic member 102 is fixed to one surface of the accommodating cavity 1011 of the lock main body 101 opposite the opening 1012. The clamping button 103 is inserted into the accommodating cavity 1011 of the lock main body 101 and is movable in the lock main body 101. The other end of the elastic member 102 abuts against the clamping button 103. The lock main body 101 is detachably fixed to the bottom plate 104. A product with a hole, such as a zipper piece of a suitcase, presses the clamping button 103, the clamping button 103 abuts against the other end of the elastic member 102, and the hole of the product is clamped into the clamping boss 1032 of the clamping button 103, the elastic member 102 provides a pressure, and the product is locked by the lock 100. By pressing the clamping button 103 of the lock 100, the product with a hole can be taken out, which is very convenient.

The embodiments of the present application further provide an embodiment of a suitcase, and the suitcase includes the lock 100. For the specific structure and function of the lock 100, reference may be made to the above embodiments, which will not be repeated here.

It should be noted that the description of the present application and the accompanying drawings provide preferred embodiments of the present application, but are not limited to the embodiments described in the present specification. Further, for those of ordinary skill in the art, improvements or changes may be made according to the above description, and all these improvements and changes should fall within the protection scope of the appended claims of the present application.

The invention claimed is:

1. A lock, comprising:

a lock main body, provided with an accommodating cavity, an opening located at an end of the accommodating cavity, and a first through hole located at a side of the accommodating cavity, the opening and the first through hole both being in communication with the accommodating cavity, the first through hole is configured for insertion of a product with a hole;

an elastic member, one end of the elastic member being fixed on the bottom of the accommodating cavity opposite the opening; and a clamping button, comprising a button main body provided with a groove and a clamping boss obtained by extending from the button main body towards the groove, wherein the button main body is inserted into the accommodating cavity from the opening, the button main body is movable relative to the lock main body, the button main body abuts against the other end of the elastic member, and the clamping boss corresponds to the first through hole and is configured to be inserted into the hole of the product to realize locking.

2. The lock according to claim 1, wherein one surface of the clamping boss facing the first through hole is an inclined surface inclined toward the accommodating cavity.

3. The lock according to claim 1, wherein the clamping button further comprises a hook obtained by extending from the button main body; and the lock main body is further provided with a second through hole in communication with the accommodating cavity, a hook portion of the hook extends into the second through hole, and the hook portion of the hook is movable relative to the second through hole.

4. The lock according to claim 1, wherein the button main body is further provided with a chute, the lock main body has a sliding rail protruding toward the accommodating cavity, the button main body is accommodated in the accommodating cavity, the sliding rail is clamped into the chute, and the sliding rail is slidable along the chute.

5. The lock according to claim 4, wherein quantities of the chutes and the sliding rails are at least two, at least two of the chutes are respectively located on two opposite surfaces of the button main body, and the chutes correspond to the sliding rails one by one.

6. The lock according to claim 1, wherein the clamping button further comprises a locking portion obtained by extending from one end of the button main body close to the opening, the locking portion is provided with a locking hole, and the locking hole is used for inserting a locking pin.

7. The lock according to claim 1, wherein quantities of the clamping bosses and the first through holes are at least two, at least two of the clamping bosses are arranged side by side at an interval, and at least two of the first through holes are arranged side by side at an interval.

8. The lock according to claim 1, further comprising a bottom plate, wherein the bottom plate is provided with a third through hole, a first blocking piece and a second blocking piece extend from the bottom plate toward the third through hole, and the first blocking piece and the second blocking piece are arranged at an interval;

a boss protrudes outward from the lock main body, a fixing piece extends from the boss, the boss is accommodated between the first blocking piece and the second blocking piece, the first blocking piece and the second blocking piece are located between the fixing piece and the lock main body, and the first blocking piece and the second blocking piece are used for limiting the position of the fixing piece.

9. The lock according to claim 8, wherein a position-limiting plate extends from the bottom plate toward the third through hole, the position-limiting plate points to a gap between the first blocking piece and the second blocking piece, and the position-limiting plate is spaced a predetermined distance from the gap.

10. A suitcase, comprising the lock according to any one of claims 1 to 9.

* * * * *